2,871,245

NEW 1-DEHYDRO-TESTOSTERONES AND ESTERS THEREOF

Albert Wettstein and Ernst Vischer, Basel, Charles Meystre, Arlesheim, and Ludwig Ehmann, Basel, Switzerland, assignors to Ciba Pharmaceutical Products Inc., Summit, N. J.

No Drawing. Application June 18, 1957
Serial No. 666,460

Claims priority, application Switzerland June 19, 1956

4 Claims. (Cl. 260—397.4)

This invention relates to the manufacture of 1-dehydro-testosterones containing in the 17α-position an alkenyl radical of two to four carbon atoms and their esters, for example 1-dehydro-17α-vinyl-, 17α-isopropenyl-, -17α-allyl- or -methallyl-testosterone and their esters. On account of their anabolic activity these compounds are of therapeutical interest and are intended for use as medicaments in diseases calling for such activity. Surprisingly the anabolic action is not accompanied by an outstanding specifically sexual action, so that these properties render the said compounds especially valuable for the treatment of all those conditions which require an enhanced formation of proteins and in which the sexual effect is undesirable such as underweight, post operative and post infectious conditions, asthenia post partum and in geriatrics.

The above compounds are obtained by introducing a double bond into the 1,2- and/or 4,5-position of 3-oxo-17β-hydroxy-androstane or testane compounds saturated in the 1,2- and/or 4,5-position and having in 17α-position an alkenyl group of two to four carbon atoms or their esters. They may however also be obtained from $\Delta^{1,4}$-3,17-dioxo-androstadiene by reacting the latter, whilst temporarily protecting the 3-oxo-group, with a metal organic compound containing an alkenyl radical of two to four carbon atoms, and, if desired, converting the resulting products into their esters.

For the purpose of introducing a double bond in the 1,2- and/or 4,5-position of the above mentioned starting compounds various methods are suitable, such as for example microbiological dehydrogenation by means of enzymes of suitable fungi, dehydrogenation by means of selenium compounds having a dehydrogenating effect or halogenation of androstane or testane compounds saturated in ring A, whilst isolating 2,4-dihalogen compounds, and splitting off hydrogen halide by means of agents capable of splitting off hydrogen halide, such as tertiary organic bases.

For microbiological dehydrogenation there come into consideration enzymes from various classes of fungi, for example from the genus Mycobacterium, and particularly of the species *Mycobacterium phlei* or *smegmatis*, or *Septomyxa* or, according to copending application Serial No. 563,437, filed February 6, 1956, by Albert Wettstein et al. the species *Didymella lycopersici, Calonectria decora, Alternaria passiflorae, Ophiobolus heterostrophus* or *Ophiobolus miyabeanus*.

The dehydrogenation by means of dehydrogenating selenium compounds can, for example, be carried out by means of selenium dioxide or selenious acid. The starting materials are boiled under reflux with the selenium compound in a suitable solvent, advantageously a tertiary alcohol, such as tertiary butanol or amylene hydrate. A special form of this method is described in copending application, Serial No. 664,920, filed June 11, 1957, by Albert Wettstein et al. in which the dehydrogenation is carried out by means of the said selenium compounds in the presence of metals of the second or eighth group of the periodic system of the elements, increased yields being obtained.

As starting materials there are preferably used such starting compounds as yield the especially valuable 1-dehydro compounds mentioned above.

In the 1-dehydro-testosterone esters substituted in 17α-position of the preesnt invention the acid radicals are those of any organic acids, such as aliphatic, alicyclic, araliphatic, aromatic or heterocyclic carboxylic acids, thiocarboxylic acids, thiolcarboxylic acids or sulfonic acids, preferably formic acid, acetic acid, chloracetic acids, trifluoracetic acid, propionic acid, butyric acids, valeric acids, trimethylacetic acid, diethylacetic acid, caproic acids, oenanthic acids, caprylic acids, palmitic acids, crotonic acid, undecanic acid, undecylenic acid, oxalic acid, succinic acid, pimelic acid, maleic acid, lactic acid, carbamic acids, alkoxy carboxylic acids, cyclopentylpropionic acid, hexahydrobenzoic acid, benzoic acid, phenylacetic acid, cyclohexylacetic acid, orthomethyl benzoic acid, 1-ethyl-cyclohexane carboxylic acid, 1-methyl-cyclopropane carboxylic acid, 1-ethyl-cyclopentane carboxylic acid, phenylpropionic acid, trimethylgallic acid, phthalic acid, furane-2-carboxylic acid or isonicotinic acid.

The 1-dehydro-testosterones substituted in 17α-position can be converted by methods known per se into their esters, for example those of the above mentioned acids.

The present invention also includes mixtures of substances for use in the treatment of human beings and animals which contain one of the mentioned 1-dehydrotestosterone derivatives or the esters thereof and a solid or liquid medicament carrier. These mixtures can be made up in the form of tablets, dragees, salves, creams or in liquid form with the active substance dissolved or suspended, for example in microcrystalline or emulsified form. As carriers there are suitable compounds which do not react with the active substance, for example, water, vegetable oils, for example sesame oil, benzyl alcohol polyethylene glycol, gelatine, starch, magnesium stearate or talc.

The following examples illustrate the invention:

Example 1

2 grams of sodium nitrate, 1 gram of primary potassium ortho-phosphate, 0.5 gram of magnesium sulfate-heptahydrate, 0.5 gram of potassium chloride, 50 grams of glucose and 1 gram of Difco yeast extract are dissolved in 1 liter of tap water, adjusted to a pH value of 5 by the addition of sodium hydroxide and sterilized. The resulting nutrient solution is inoculated with 50 cc. of a 4-day old culture of *Didymella lycopersici* and is agitated for 48 hours at 27° C., the culture developing well. A solution of 500 mg. of 17α-vinyl-testosterone in 15 cc. of acetone is added to 2 liters of the above culture under sterile conditions. The whole is agitated for 3 days at 27° C., the mycelium is suction-filtered, washed with water and ethyl acetate, and the combined filtrates are extracted with ethyl acetate. The ethyl acetate solutions are washed with water, dried and evaporated in vacuo. The extraction residue is recrystallized from a mixture of acetone and isopropyl ether, and 1-dehydro-17α-vinyl-testosterone melting at 165°–166° C. is obtained.

Example 2

32.8 grams of 17α-isopropenyl-testosterone are dissolved in 700 cc. of tertiary butyl alcohol and 23 cc. of glacial acetic acid and, after the addition of 9 grams of magnesium powder, heated to the boil while stirring and passing a stream of nitrogen over the mixture. In the course of 4–5 hours a solution of 23 grams of selenium dioxide in 300 cc. of tertiary butyl alcohol is run in. The reaction mixture is then boiled for another 4–5 hours while stirring and then cooled. After the addition of 30 grams of active carbon, the mixture is diluted with ethyl acetate and filtered. The filtrate is washed with saturated sodium carbonate solution, 2 N-soda solution and water, dried over sodium sulfate, filtered and evaporated. The monoselenium derivative of 1-dehydro-17α-isopropenyl-testosterone which crystallizes out is separated and the mother liquor evaporated completely. The residue is dissolved in benzene and chromatographed over alumina. The initial fractions which crystallize when the solvent is expelled are recrystallized from methanol and yield 20.3 grams of 1-dehydro-17α-isopropenyl-testosterone.

To obtain the starting material, a lithium-isopropenyl solution in pentane, prepared from 20 grams of lithium, is added dropwise in the course of 5 hours to a solution of 31.4 grams of androstene-3,17-dione-3-enol-ethyl ether in 600 cc. of benzene while stirring in an atmosphere of argon. The reaction mass is then stirred for another 4 hours at room temperature. The reaction mixture is poured into ice water and acidified with dilute hydrochloric acid. The separated benzene-pentane layer is washed neutral with water, dried over sodium sulfate, filtered and evaporated. The residue is recrystallized from ethyl alcohol and yields 25.1 grams of 17α-isopropenyl-testosterone.

*Example 3*

42 grams of 17α-allyl-testosterone, prepared as described by A. Butenandt and D. Peters, Berichte der deutschen chemischen Gesellschaft 71, 2688–2695 (1938), are dissolved in 600 cc. of tertiary amyl alcohol and 25 cc. of glacial acetic acid. 4 grams of mercury are added and the mixture heated to the boil while stirring and passing a stream of nitrogen over it. In the course of 5 hours a solution of 23 grams of selenium dioxide in 270 cc. of tertiary amyl alcohol is added drop by drop and the whole then boiled for another 5 hours. The reaction mixture is cooled and diluted with methylene chloride and, after the addition of 30 grams of active carbon, filtered until it is clear. The dark yellow-brown filtrate is washed in succession with saturated sodium chloride solution, 2N-caustic soda solution and water. After being dried over sodium sulfate, the methylene chloride extract is concentrated by evaporation, the monoselenium derivative of 1-dehydro-17α-allyl-testosterone crystallizing out. The mother liquor obtained when the monoselenium derivative is separated is evaporated completely and the residue chromatographed over alumina. The initial fractions are evaporated and the residues recrystallized from methanol and give 24.8 grams of 1-dehydro-17α-allyl-testosterone.

What is claimed is:

1. A member selected from the group consisting of a 1-dehydro-testosterone substituted in 17α-position with an alkenyl radical of two to four carbon atoms and an ester thereof.
2. 1-dehydro-17α-vinyl-testosterone.
3. 1-dehydro-17α-isopropenyl-testosterone.
4. 1-dehydro-17α-allyl-testosterone.

References Cited in the file of this patent

UNITED STATES PATENTS

| | | |
|---|---|---|
| 2,267,258 | Ruzicka | Dec. 23, 1941 |
| 2,361,847 | Inhoffen | Oct. 31, 1944 |
| 2,756,179 | Fried et al. | July 24, 1956 |
| 2,783,226 | Gould et al. | Feb. 26, 1957 |

OTHER REFERENCES

Ringold et al: J. Org. Chem. 21, pages 239–40 (1956).